(12) United States Patent
Sultenfuss et al.

(10) Patent No.: US 11,256,647 B2
(45) Date of Patent: Feb. 22, 2022

(54) DOCKING SYSTEM UTILIZING MULTIMODE USB-C POWER TRANSMISSION AND CONVERSION

(71) Applicant: Dell Products, L.P., Round Rock, TX (US)

(72) Inventors: Andrew Thomas Sultenfuss, Leander, TX (US); Richard C. Thompson, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 22 days.

(21) Appl. No.: 16/751,618

(22) Filed: Jan. 24, 2020

(65) Prior Publication Data
US 2021/0232526 A1 Jul. 29, 2021

(51) Int. Cl.
*G06F 13/40* (2006.01)
*G06F 1/26* (2006.01)
*G06F 13/42* (2006.01)

(52) U.S. Cl.
CPC .......... *G06F 13/4068* (2013.01); *G06F 1/266* (2013.01); *G06F 13/4282* (2013.01); *G06F 2213/0042* (2013.01)

(58) Field of Classification Search
CPC ....... G06F 13/38; G06F 13/42; G01R 19/165; G01R 31/02
See application file for complete search history.

(56) References Cited

U.S. PATENT DOCUMENTS

| | | | | |
|---|---|---|---|---|
| 2016/0349292 A1* | 12/2016 | Atkinson | ................. | G06F 1/266 |
| 2018/0081843 A1* | 3/2018 | Kadgi | ...................... | G06F 13/20 |
| 2018/0165053 A1* | 6/2018 | Kuo | .......................... | G06F 1/16 |
| 2019/0042503 A1* | 2/2019 | Montero | ............. | G06F 13/4282 |
| 2019/0121771 A1* | 4/2019 | Kadgi | ................... | G06F 1/1654 |
| 2020/0348723 A1* | 11/2020 | Wood, III | ............. | G06F 13/385 |

\* cited by examiner

*Primary Examiner* — Getente A Yimer
(74) *Attorney, Agent, or Firm* — Fogarty LLP

(57) ABSTRACT

Multimode docking station embodiments provide power to an Information Handling System (IHS). The docking station detects the coupling of a multimode USB-C adapter that supports USB-PD (USB Power Delivery) transmissions and also supports a high-power transmission of a voltage greater than the USB-PD transmissions. The docking station configures a power transmission by the multimode USB-C adapter based on a power request by the IHS. Based on the power request by the IHS, a power circuit of the docking station is configured for providing the transmission to the IHS. When the multimode adapter provides a USB-PD power transmission, the power circuit routes the transmission directly to the docking port. When a high-power transmission is provided, a portion of the power transmission is converted by the power circuit for use by external devices coupled to the docking station, with another portion being provided to the IHS as a USB-PD transmission.

20 Claims, 7 Drawing Sheets

DOCKING SYSTEM UTILIZING MULTIMODE USB-C POWER TRANSMISSION AND CONVERSION

FIELD

This disclosure relates generally to Information Handling Systems (IHSs), and more specifically, to docking stations that support portable IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Certain IHSs, such as laptops, tablets and mobile phones, are portable and are designed to operate using power supplied by rechargeable batteries. Power drawn from an electrical outlet may be used to charge the batteries of a portable IHS. Since the batteries of IHSs operate using DC (Direct Current) power, an AC adapter (i.e., AC/DC adapter or AC/DC converter) is required to convert the AC power from the wall outlet to DC power that can be used to charge the batteries. In some instances, AC adapters may provide DC power to an IHS via a cylindrical, barrel connector that couples with a corresponding DC power port receptable of the IHS. In some instances, DC power may be additionally or alternatively provided via a USB (Universal Serial Bus) coupling. The USB Power Delivery (USB-PD) Specification specifies communications between an AC adapter and an IHS that enable negotiation of various supply voltages that are supported by the AC adapter and that may be provided to the IHS via a USB port.

A docking station may be used to support the use of a mobile IHS while at a workstation that is available for use at a fixed location. The docking station may support use of the mobile IHS while utilizing external displays and other I/O devices coupled to the docking station, such as speakers, external keyboards, a mouse or other pointing device, cameras, etc. In addition, while the mobile IHS is docked, a docking station may provide power to a mobile IHS. A mobile IHS may utilize the power provided by a docking station for powering the mobile IHS and for recharging the internal batteries of the mobile IHS. In some scenarios, such as at a public workstation, a docking station may support providing power to multiple different types of mobile IHSs.

SUMMARY

In various embodiments, docking stations provide power to an Information Handling System (IHS) via a USB-C (Universal Serial Bus Type-C) docking connection, the docking stations may include: a USB-C port; a USB-C docking port; a plurality of ports for coupling external devices to the docking station; and a logic unit operable to: detect a multimode USB-C adapter coupled to the USB-C port, wherein multimode USB-C adapter supports USB-PD (Universal Serial Bus Power Delivery) power transmissions, and wherein the USB-C adapter further supports a high-power transmission of a voltage greater than the USB-PD power transmissions; configure a power transmission of the multimode USB-C adapter based on a power request by the IHS, wherein the IHS is coupled to the USB-C docking port; and configure, based on the power request by the IHS, a power circuit of the docking station for providing the power transmission of the multimode USB-C adapter to the IHS, wherein the power transmission is routed by the power circuit to the USB-C docking port when the power transmission comprises a USB-PD power transmission, and wherein a portion of the power transmission is converted by the power circuit for use by the external devices when the power transmission comprises a high-power transmission.

In additional docking station embodiments, the high-power transmission comprises a nominal voltage of 54 volts. In additional docking station embodiments, the high-power transmission comprises a peak voltage not exceeding 60 volts. In additional embodiments, docking stations may further include a power port for receiving a barrel connection of an AC power supply, wherein the logic unit is further operable to configure the power circuit of the docking station for converting a power transmission of the AC power supply for transmission to the IHS. In additional docking station embodiments, the power transmission is converted by the power circuit to a USB-PD power transmission based upon the power request by the IHS, and wherein the power transmission is converted by the power circuit to a high-power transmission based upon the power request by the IHS. In additional docking station embodiments, a high-power transmission provided to the IHS comprises greater than 200 watts of power. In additional docking station embodiments, the power circuit comprises a plurality of digital voltage dividers operable for converting the high-power transmission for use by the external devices. In additional docking station embodiments, the logic unit is further operable to: configure a high-power transmission by the multimode USB-C adapter when the power request by the IHS comprises a request for a USB-PD power transmission; and configure the power circuit to utilize the high-power transmission for providing power to the external devices and for generating the requested USB-PD power transmission to the IHS.

In various additional embodiments, Information Handling Systems (IHSs) may include: one or more processors; a memory device coupled to the one or more processors, the memory device storing computer-readable instructions that, upon execution by the one or more processors, cause execution of an operating system of the IHS; a USB-C port; and an embedded controller comprising a memory having program instructions stored thereon that, upon execution by a logic unit of the embedded controller, cause the embedded controller to: detect a coupling of a multimode docking station to the USB-C port; send a power request to the multimode docking station via the USB-C port coupling; route USB-PD supply inputs received from the docking station to a power supply unit of the IHS; and route a high-power supply input received from the docking station to a high-power conversion circuit of the IHS, wherein a voltage of the high-power supply input is greater than voltages of the USB-PD supply inputs.

In additional IHS embodiments, the high-power supply input received from the docking station comprises a nominal voltage of approximately 54 volts. In additional IHS embodiments, the high-power supply input received from the docking station comprises a peak voltage not exceeding 60 volts. In additional IHS embodiments, the high-power conversion circuit comprises a plurality of digital voltage dividers operable for converting the high-power supply input received from the docking station to an input utilized by the IHS. In additional IHS embodiments, the high-power conversion circuit is configured by selecting a portion of the plurality of digital voltage dividers for use in converting the high-power supply input to the input. In additional IHS embodiments, the high-power supply input comprises greater than 200 watts of power.

In various additional embodiments, methods are provided for powering an Information Handling System (IHS) by a docking station via a USB-C docking connection. The methods may include: detecting a multimode USB-C power source coupled to a USB-C port of the docking station, wherein multimode USB-C power source supports USB-PD (Universal Serial Bus Power Delivery) power transmissions, and further supports a high-power transmission of a voltage greater than the USB-PD power transmissions; configuring a power transmission of the multimode USB-C power source based on a power request of the IHS; configuring, based on the power request by the IHS, a power circuit of the docking station for providing the power transmission of the multimode USB-C adapter to the IHS, wherein the power transmission is routed by the power circuit to the USB-C docking connection when the power transmission comprises a USB-PD power transmission, and wherein a portion of the power transmission is converted by the power circuit for use by a plurality of external devices coupled to the docking station when the power transmission comprises a high-power transmission.

In additional method embodiments, the high-power transmission comprises a nominal voltage of 54 volts. In additional method embodiments, the high-power transmission comprises a peak voltage not exceeding 60 volts. In additional method embodiments, the power transmission provided to the IHS comprises greater than 200 watts of power when the power transmission comprises a high-power transmission. In additional method embodiments, the power circuit comprises a plurality of digital voltage dividers operable for converting the high-power transmission for use by the external devices. In additional embodiments, methods may further include: configuring a high-power transmission by the multimode USB-C adapter when the power request by the IHS comprises a request for a USB-PD power transmission; and configuring the power circuit to utilize the high-power transmission for providing power to the external devices and for generating the requested USB-PD power transmission to the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
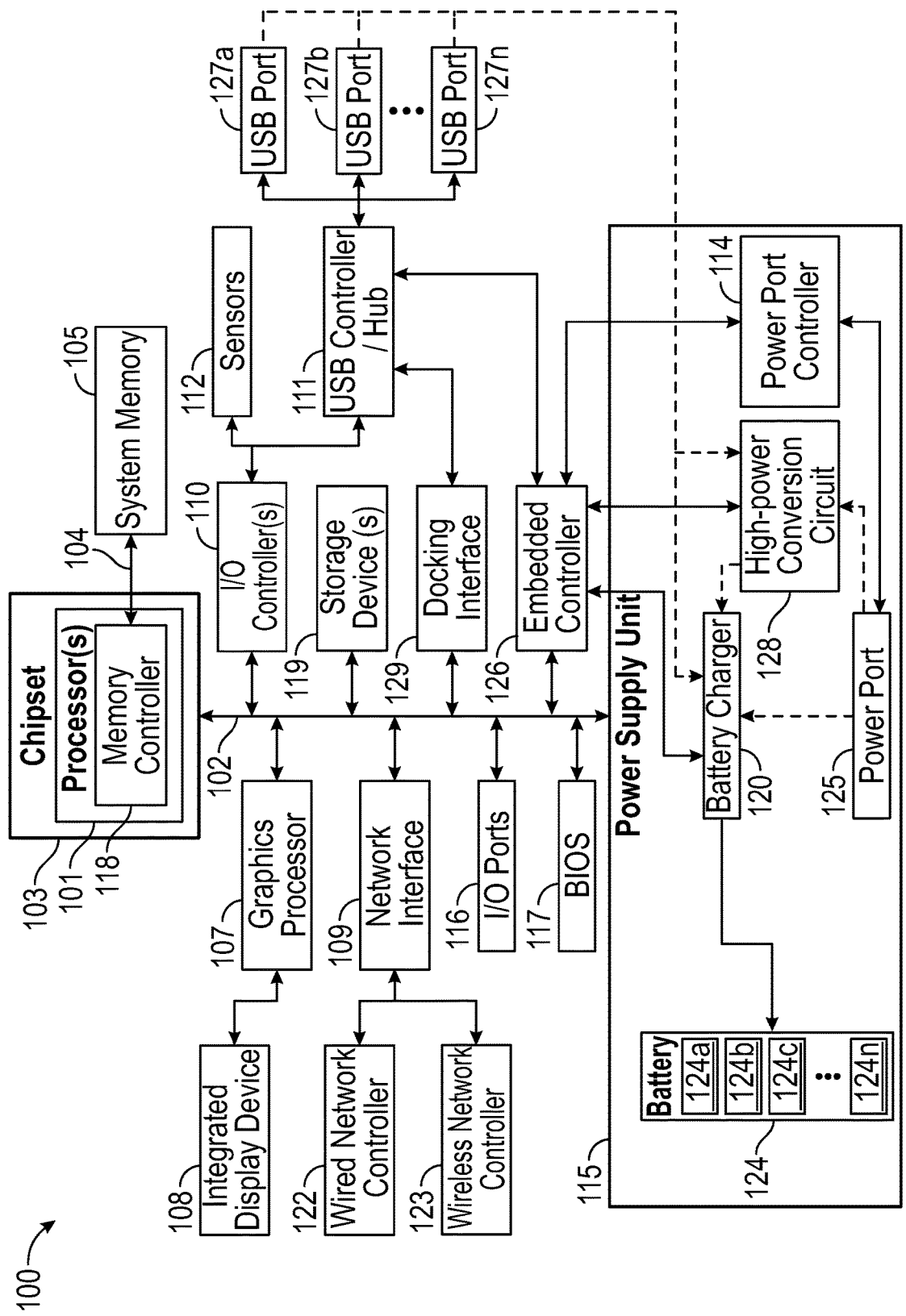
FIG. 1 is a block diagram depicting certain components of an IHS operable according to various embodiments for participating in a multimode USB-C docking system.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, certain portable IHSs may utilize AC adapters for providing power from an electrical outlet that is converted to a DC output that is used in powering a portable IHS and/or recharging internal batteries of a portable IHS. As IHSs become thinner, and thus more portable, it is preferable that the AC adapters used for charging portable IHSs also remain as thin and as portable as possible. The adoption of thinner charging connectors promotes thin portable IHSs and thin AC adapters. For instance, USB-C connectors may support providing an IHS with charging inputs and may be considerably thinner than USB Type A connectors, as well as being thinner than the cylindrical barrel connectors that are commonly supported by IHS power ports.

While IHSs become increasingly thinner and more portable, the power requirements for portable IHSs are not necessarily decreasing. As described with regard to FIG. 1, certain portable IHSs such as laptops may include multi-core processors, a separate graphics processor, significant amounts of memory, persistent storage drives, specialized microcontrollers and one or more integrated displays. Such high performance portable IHSs may have significant power demands, in some cases greater than 200 watts. In some instances, portable IHSs may have power demands as high as 250 watts. In many instances, portable IHSs may also be expected to serve as a source of power for external devices coupled to the portable IHS. USB-C power adapters utilize thin cabling that limits power transmissions to 5 amps. Since charging voltages specified by USB-PD protocols are limited to 20 volts, existing USB-C power adapters are limited to providing less than 100 watts of power.

In order to be classified as NEC (National Electrical Code) Class 2 or Class 3 power supply units, the output of a power supply must be less than 60 volts. Power supplies with voltage outputs greater than 60 volts may be considered to pose a risk of fire or electric shock and may thus be subject to additional circuit protection requirements. Accordingly, embodiments provide support for AC power adapters capable of transmitting output voltages up to 60 volts that may be used to provide upwards of 200 watts of power to IHSs. As described in additional detail below, embodiments may support transmission of supply voltages up to 60 volts via USB-C couplings and may convert the transmitted supply voltage to high-power charging outputs greater than 200 watts through the use of a high-efficiency, high-power conversion circuit of the IHS. Power adapters according to embodiments that support transmission of supply voltages up to 60 volts may be USB-C power adapters that utilize the various pins supported by USB-C connectors to support use of data lines and power supply lines between an IHS and a coupled device. Using these USB-C couplings, the power supply lines may support bi-directional charge transfer where the IHS may either be supplied with power or may serve as a source of power. Using the high-power conversion circuit of IHS embodiments, multimode USB-C power adapters and/or multimode docking stations may support transmission of voltages up to 60 volts, as well as transmission of supply voltages supported by the USB-PD specifications (e.g., 5V, 9V, 15V, 20V), thus providing multimode charging outputs.

FIG. 1 is a block diagram illustrating certain components of an IHS 100 configured according to certain embodiments for participating in a multimode USB-C docking system, where the multimode docking system may provide IHS 100 with high-power inputs via a USB-C coupling, such as inputs exceeding 200 watts, while also supporting providing power to IHS 100 via USB-PD inputs. In various embodiments, IHS 100 may include an embedded controller 126 that includes logic that executes program instructions, in conjunction with operations by components of power supply unit 115 and USB controller 111, to perform the operations disclosed herein for configuring multimode USB-C power transmission and conversion. While a single IHS 100 is illustrated in FIG. 1, IHS 100 may be a component of an enterprise system that may include any number of additional IHSs that may also be configured in the same or similar manner to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip.

Graphics processor 107 may generate display information and provide the generated information to one or more display device(s) 108 coupled to the IHS 100. The one or more display devices 108 coupled to IHS 100 may utilize LCD, LED, OLED, or other display technologies. Each display device 108 may be capable of receiving touch inputs such as via a touch controller that may be an embedded component of the display device 108 or graphics processor 107, or may be a separate component of IHS 100 accessed via bus 102. IHS 100 may support an integrated display device 108, such as a display integrated into a laptop, tablet, 2-in-1 convertible device, or mobile device. In some embodiments, IHS 100 may be a hybrid laptop computer that includes dual integrated displays incorporated in both of the laptop panels. Via a docking interface 126, IHS 100 may also support use of one or more external displays such as external monitors that may be connected to a docking system via various types of couplings.

In certain embodiments, chipset 103 may utilize one or more I/O controllers 110 that may each support hardware components such as user I/O devices 111 and sensors 112. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections. Via a docking interface 126, IHS 100 may also support use of one or more user I/O devices that may be connect to a docking system via various types of wired and wireless couplings.

In certain embodiments, sensors 112 accessed via I/O controllers 110 may provide access to data describing environmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100.

As illustrated, I/O controllers 110 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC of IHS 100, embedded controller 126, processors 101, or of an operating system of IHS 100. USB controller 111 supports communications between IHS 100 and one or more USB devices coupled to IHS 100, whether the USB devices may be coupled to IHS 100 via wired or wireless connections. In some embodiments, a USB controller 111 may operate one or more USB drivers that detect the coupling of USB devices and/or power inputs to USB ports 127a-n. USB controller 111 may include drivers that implement functions for supporting communications between IHS 100 and coupled USB devices, where the USB drivers may support communications according to various USB protocols (e.g., USB 2.0, USB 3.0). In providing functions of a hub, USB controller 111 may support concurrent couplings by multiple USB devices via one or more USB ports 127a-n supported by IHS 100.

In some embodiments, USB controller 111 may control the distribution of both data and power transmitted via USB ports 127a-n. For instance, USB controller 111 may support data communications with USB devices that are coupled to the USB ports 127a-n according to data communication protocols set forth by USB standards. The power transmissions supported by USB controller 111 may include incoming charging inputs received via USB ports 127a-n, as well as outgoing power outputs that are transmitted from IHS 100 to USB devices that are coupled to USB ports 127a-n. In some embodiments, USB controller 111 may interoperate with embedded controller 126 in routing power inputs received via USB ports 127a-n to a battery charger 120 supported by the power supply unit 115 of IHS 100. USB controller 111 may negotiate the transmission of power inputs received via USB ports 127a-n, where these power inputs may include USB-PD power inputs as well as high-power inputs of up to 60 volts. Using a high-power conversion circuit 126, the power supply unit 115 may convert received supply inputs of up to 60 volts to voltages (e.g., 18-20 volts) suitable for use in rapidly charging the internal batteries 124 of IHS 100, supporting high-power operations of IHS 100, and/or serving as a power source for external devices that are coupled to a USB port 127a-n of IHS 100. In some scenarios, the operation of power conversion circuit 112 may support power transfers that support high-power operations of the IHS, while still providing sufficient power to also continue in providing power to external devices coupled to a USB port 127an-n of IHS 100. As described in additional detail below, in scenarios where a multimode power source according to embodiments is detected as being coupled to one of the USB ports 127a-n, USB controller 111 may receive inputs from embedded controller 126 that direct power received at USB ports 127a-n to be routed to a high-power conversion circuit 128.

In various embodiments, IHS 100 may be coupled to a docking station via one of the USB ports 127a-n, such as a USB-C port. In scenarios where a docking station is detected as being coupled to a USB port 127a-n of IHS 100, the USB controller 111 may route some or all of the data inputs received via the USB port 127a-n to a docking interface 129. As described, in addition to supporting data communications with various I/O devices, a docking station may provide IHS 100 with power. As described in additional detail with regard to the below embodiments, a docking station coupled to a USB-C port 127a-n may support power delivery outputs that conform to the USB-PD specification, as well as supporting delivery of high-power outputs that may provide IHS 100 with upwards of 200 watts of power via the USB-C coupling between the IHS 100 and docking station.

Other components of IHS 100 may include one or more I/O ports 116 that support removeable couplings with various types of peripheral external devices. I/O ports 116 may include various types of ports and couplings that support connections with external devices and systems, either through temporary couplings via ports, such as HDMI ports, accessible to a user via the enclosure of the IHS 100, or through more permanent couplings via expansion slots provided via the motherboard or via an expansion card of IHS 100, such as PCIe slots.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. In some embodiments, BIOS 117 may be implemented using a dedicated microcontroller coupled to the motherboard of IHS 100. In some embodiments, BIOS 117 may be implemented as operations of embedded controller 126. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100.

Embedded controller 126 may also implement operations for interfacing with a power supply unit 115 in managing power for IHS 100. In certain instances, the operations of embedded controller may determine the power status of IHS 100, such as whether IHS 100 is operating strictly from battery power, whether any charging inputs are being received by power supply unit 115, and/or the appropriate mode for charging the one or more battery cells 124a-n using the available charging inputs. Embedded controller 126 may support routing and use of power inputs received via a USB port 127a-n and/or via a power port 125 supported by the power supply unit 115. In addition, operations of embedded controller 126 may provide battery status information, such as the current charge level of the cells 124a-n of battery 124.

In management of operating modes of IHS 100, embedded controller 126 may implement operations for detecting certain changes to the physical configuration of IHS 100 and managing the modes corresponding to different physical configurations of IHS 100. For instance, where IHS 100 is a laptop computer or a convertible laptop computer, embedded controller 126 may receive inputs from a lid position sensor that may detect whether the two sides of the laptop have been latched together to a closed position. In response to lid position sensor detecting latching of the lid of IHS 100, embedded controller 126 may initiate operations for shutting down IHS 100 or placing IHS 100 in a low-power mode.

In this manner, IHS 100 may support the use of various power modes. In some embodiments, the power modes of IHS 100 may be implemented through operations of the embedded controller 126 and power supply unit 115. In various embodiments, a mobile IHS 100 may support various low power modes in order to reduce power consumption and/or conserve power stored in battery 124 when mobile IHS 100 is not actively in use. The power modes may include a fully on state in which all, or substantially all, available components of mobile IHS 100 may be fully powered and operational. In a fully off power mode, processor(s) 101 may powered off, any integrated storage devices 119 may be powered off, and/or integrated displays 108 may be powered off. In an intermediate low-power mode, various components of mobile IHS 100 may be powered down, but mobile IHS 100 remains ready for near-immediate use. In a standby power mode, which may be referred to as a sleep state or hibernation state, state information may be stored to storage devices 119 and all but a selected set of components and low-power functions of mobile IHS 100, such as standby functions supported by embedded controller 126, are shut down.

As described, IHS 100 may also include a power supply unit 115 that receives power inputs used for charging batteries 124 from which the IHS 100 operates. IHS 100 may include a power port 125 to which an AC adapter may be coupled to provide IHS 100 with a DC supply of power. The DC power input received at power port 125 may be utilized by a battery charger 120 for recharging one or more internal batteries 124 of IHS 100. As illustrated, batteries 124 utilized by IHS 100 may include one or more cells 124a-n that may connected in series or in parallel. Power supply unit 115 may support various modes for charging the cells 124a-n of battery system 124 based on the power supply available to IHS 100 and the charge levels of battery system 124.

In certain embodiments, power supply unit 115 of IHS 100 may include a power port controller 114 that is operable for configuring operations by power port 125. In certain embodiments, power port controller 114 may be an embedded controller that is a motherboard component of IHS 100, a function supported by a power supply unit 115 embedded controller, or a function supported by a system-on-chip implemented by processors 101. In some embodiments, power port controller 114 may exchange communications, such as PSID (Power Supply Identifier) signals, with a multimode power source coupled to power port 125 in identifying the adapter and negotiating its output. As described in additional detail regard to the below embodiments, in scenarios where a high-power supply is detected as being coupled to power port 125, power port controller 114 may receive inputs from embedded controller 126 directing the power supply input received at power port 125 to be routed to a high-power conversion circuit 128.

As described, in various scenarios, IHS 100 may also receive power supply inputs via a USB-C port 127a-n, wherein these power supply inputs may be delivered via a USB-C connection with a multimode docking station or with a multimode AC adapter. As described in additional detail below, via a USB-C port 127a-n coupling with IHS 100, a multimode docking station according to embodiments may support power delivery conforming to the USB-PD specification, as well as supporting delivery of high-power outputs that may provide IHS 100 over 200 watts of power. In various embodiments, embedded controller 126 and/or USB controller 111 may negotiate with the multimode docking station to determine the parameters for the power to be supplied by the docking station. In scenarios where the negotiation results in delivery of a high-power supply by the multimode docking station via a USB-C coupling to a USB-C port 127a-n, the USB controller 111 may configure the USB-C port 127a-n to route power delivery inputs to a high-power conversion circuit 128 of the power supply 115.

Using the high-power conversion circuit 128, the power supply unit 115 converts received supply inputs of up to 60 volts to a voltage (e.g., 18-20 volts) suitable for use in charging the internal battery system 124 of IHS 100, directly powering the operations of IHS 100 and/or providing power to external devices coupled to IHS 100. In scenarios where the supply voltage is being provided by a multimode docking station or multimode AC adapter via a USB-C port 127a-n, USB-C power cords may be limited to transmitting 5 amps of current. In such instances, the high-power conversion circuit 128 may convert received 5-amp supply inputs of up to 60 volts to a power supply of approximately 18 volts/12 amps that is usable by IHS 100. In this manner, high power conversion circuit 128 may support use of USB-C couplings for transmission of power at voltages up to 60 volts and conversion of the supply voltage in a manner that supports power requirements above 200 watts, in some cases above 250 watts.

In some embodiments, high-power conversion circuit 128 may be implemented using a buck converter that includes a set of digital voltage dividers (i.e., digital potentiometers) that may be driven at high frequencies (e.g., 10 MHz) in order to support high-efficiency voltage conversion. In some embodiments, the digital voltage dividers of the high-power conversion circuit 128 may be configured for being driven at high frequencies via the use of switching elements that utilize a GaAs semiconductor, as the inventors have recognized this configuration provides efficiency improvements over existing power supply techniques used to deliver power in the range of 60 volts. Existing buck converters that are utilized to support IHS power supplies operate using analog, capacitive voltage dividers. When converting a 54-volt input to an 18-volt output using such existing capacitive buck converters, conversion efficiencies are typically around 88%, thus generating up to 25 watts of heat. By utilizing digital voltage dividers driven at high frequencies, up to 98% conversion efficiencies may be obtained. Through such high efficiency conversion, heat dissipation remains manageable at approximately 5 watts. In some embodiments, high-power conversion circuit 128 may be a buck-boost converter, where the buck operations utilize digital voltage dividers and boost operations may be implemented using capacitive or inductive elements. As described in additional detail with regard to FIG. 2B, in embodiments where high-power conversion circuit 128 includes buck and boost capabilities, a multimode AC adapter according to embodiments may include the same high-power conversion circuit 128 that utilizes the converter's boost capabilities to efficiently generate outputs of up to 60 volts for transmission to IHS 100, where the circuit's buck capabilities are used to efficiently convert the supply to a voltage suitable for use by the IHS. As described in additional detail with regard to FIG. 2C, a multimode docking station according to embodiments may also include the same high-power conversion circuit 128 that utilizes the converter's boost capabilities to efficiently generate outputs of up to 60 volts for transmission to IHS 100. In some embodiments, the embedded controller of an IHS may negotiate a lower supply voltage (e.g., 36 volts) with a multimode AC adapter or a multimode docking station, thus requiring use of only a single digital voltage divider by the high-power conversion circuit to reach an 18-volt output, while generating even less heat.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
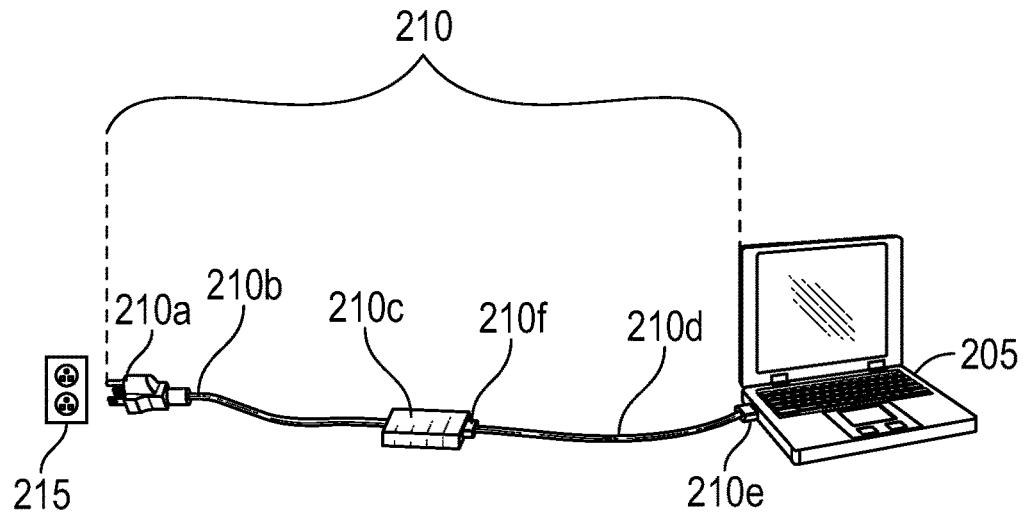
FIG. 2A is a diagram depicting certain components of multimode USB-C power supply system, according to various embodiments, that includes an AC adapter that is coupled to an IHS that is a laptop computer.

FIG. 2A is a diagram depicting components of a multimode power system according to various embodiments, where that system includes a multimode AC power adapter 210 coupled to an IHS that is a laptop computer 205. Multimode AC adapter 210 may be capable of providing supply voltages to laptop 205 that may include standard USB-PD output voltages, as well as high-power output voltages up to 60 volts. As described in additional detail with regard to FIG. 2C, in some embodiments, rather than powering IHS 205 directly, multimode AC power adapter 210 may be utilized to power a docking station that may route the delivered power to the IHS, where the docking station may negotiate with AC adapter 210 on behalf of IHS 205 in order to determine a power output to be provided by the multimode AC adapter 210.

Whether provided via a docking station or via a direct coupling with an IHS, power provided by multimode AC power adapter 210 may be used to charge the internal batteries of laptop computer 205 using power supplied via a power port or via a USB-C port of laptop 205. Via these supported power supply modes, multimode AC power adapter 210 may be used to charge the batteries of various types of portable IHSs, such as tablets, 2-1 laptops, convertible laptops, smartphones, smart watches, cameras, toys, gaming accessories, and various other types of devices. Embodiments may be implemented using all varieties of IHSs that operate on DC power supplied using rechargeable batteries and that charge these batteries using DC power converted by an AC adapter 210.

A multimode AC power adapter 210 according to embodiments may include several connected components that operate to draw AC power from an electrical outlet 215 and convert the AC power to a DC output for delivery to an IHS, such as the laptop 205 of FIG. 2A, either directly or via a docking station. One end of the AC power adapter 210 includes an AC plug 210a that includes prongs that may be inserted into slots provided by an AC electrical outlet 215. Many different types of AC plugs 210a are utilized throughout the world, with different plugs from different regions utilizing different numbers, shapes and orientations of the prongs that conform to the electrical outlets used in a region. In North America, most general-purpose electrical outlets deliver 120 V of AC at a frequency of 60 hertz.

As illustrated, an AC electrical cord 210b of multimode AC adapter 210 connects AC plug 210a to multimode converter 210c. In many embodiments, AC electrical cord 210b may be removeable from converter 210c. Embodiments may also include AC electrical cords 210b that are fixed to converter 210c. A function of a multimode converter 210c is to convert the AC received from power cord 210b to a DC output that can be used to power IHSs, either directly or via a docking station. In certain instances, converter 210c may be referred to as a power brick. In some embodiments, multimode converter 210c may generate outputs in accordance with USB-PD protocols and may also generate high-power outputs that exceed the maximum 20 volts outputs of USB-PD, such as outputs up to 60 volts. In this manner, a multimode converter 210c may support multiple output supply modes, thus providing support for providing power to a range of IHSs, including IHSs such as high-power laptop computers. In some scenarios, the ability to efficiently support high-power supply modes allows high-power operations of the IHS 205 to be supported while still providing sufficient additional power to serve as a power source for devices coupled to IHS 205.

In some embodiments, the multimode AC power adapter may support a nominal high-power charging transmission of 54 volts, thus allowing for 10 percent fluctuations in the actual charging output while still maintaining outputs below 60 volts. Typical embodiments may support other nominal charging supply voltages between 50 volts and 60 volts depending on the anticipated fluctuations in the actual charging input. Many embodiments may support nominal supply voltages ranging from 54 volts to 56 volts. Some embodiments may be configured to support charging supply voltages significantly below 50 volts.

In supporting of these multiple output supply modes, converter 210c may support identification of the multimode AC adapter 210 to the coupled IHS and/or to a coupled docking station, where this identification information may be utilized in configuring the DC power output generated by converter 210c and transmitted to IHS 205 or to a docking station. Converter 210c may also support capabilities for negotiating with IHS 205 or with a docking station to determine the parameters of the DC output supply voltage generated by converter 210c. The DC output generated by converter 210c is provided to laptop 205 or to a docking station via a DC power cord 210d that supplies the DC output via a connector that is received by a port of the laptop or by a port of a docking station.

DC cord 210d includes a DC plug 210f that may be received by a port of converter 210c. In the illustrated embodiment, the DC plug 210f is a USB-C connector that is received by a USB-C port of converter 210c. The DC plug 210e on the opposite end of DC cord 210d may be an identical to DC plug 210f and may thus also be a USB-C connector that is received by a USB-C port 205b of IHS 205 or a USB-C port of a docking station. In such embodiments, DC cord 210d may be a reversible USB-C cable with USB-C connectors on each end. In some embodiments, multimode AC adapter 210 may also support use of a DC cord 210d that, instead of USB-C connectors, includes a barrel connector for DC plug 210f that is received by a corresponding power port of converter 210c and also includes a barrel connector for DC plug 210e that is received by a power port 205a of IHS 205, or by a power port of a docking station. In some embodiments, a DC cord 210d utilizing barrel connector DC plugs 210e and 210f may be reversible. In some embodiments, converter 210c may include both one or more USB-C ports and a barrel connector power port, thus supporting two types of removeable DC cords 210d. In some embodiments, converter 210c may support a single fixed DC cord 210d that may be a USB-C cord or a DC power code utilizing a barrel connector. As described, embodiments may support the transmission of power at voltages up to 60 volts, while adhering to the 5-amp limitation on some USB-C cords 210d. The high-power conversion circuit of IHS 205 may then be used to efficiently convert the transmitted power to a usable voltage in a manner that may provide over 200 watts of power to IHS 205. Through use of the high-power conversion circuit, high-power IHSs may be supported using thin USB-C cords 210d, thus promoting the use of thinner and more portable multimode AC adapters 210 for use by a large range of IHSs, including IHSs capable of utilizing more than 200 watts of power, and in some cases up to 250 watts of power. In addition, the efficient conversion provided by the high-power conversion circuit supports the use of thinner barrel connectors and thinner cabling for DC cords that are received by the power port of the IHS. As described, IHSs continue to get thinner and more portable. In some IHSs, the IHS power port that receives a cylindrical barrel connector is one of the thickest components of the IHS. By supporting thinner barrel connectors, the diameter of the power ports supported IHSs can also be reduced, thus providing an opportunity to make IHSs still thinner.

Figure 2B:
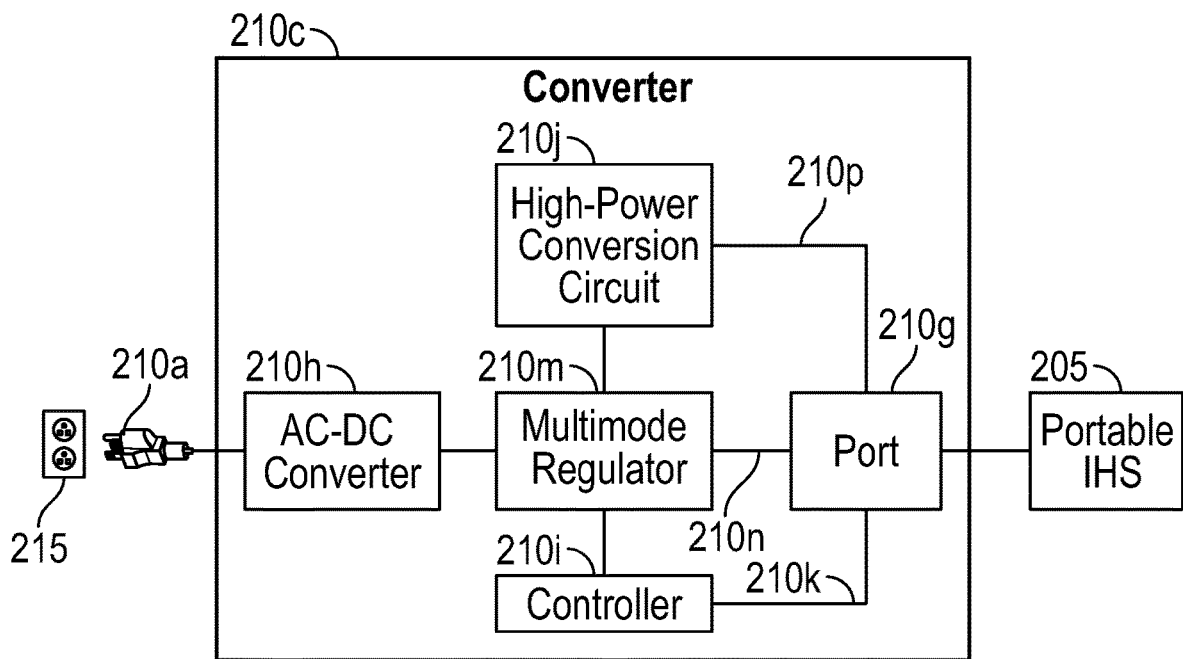
FIG. 2B is a diagram depicting certain additional components of a multimode power supply system, according to various embodiments, that includes an AC adapter that is coupled to an IHS.

FIG. 2B is a diagram depicting additional components of a multimode power system according to various embodiments, where the system includes a multimode converter 210c of AC power adapter coupled to an IHS 205. In FIG. 2B, certain of the internal components of a multimode converter 2101c, according to some embodiments, are illustrated. Multimode converter 210c receives AC power drawn from AC outlet 215 and provides portable IHS 205 with a supply of DC power, either directly or via a docking station. Multimode converter 210c may utilize an AC/DC converter 210h that receives the AC power and generates a supply of DC power that may be supplied to a multimode regulator 210m. Based on configurations provided by a controller 210i of the converter 210c, multimode regulator 210m may supply a regulated supply of DC power to a power port 210g of the converter or to a high-power conversion circuit 210j.

As described, in some embodiments, converter 210c may be coupled to mobile IHS 205 via a USB-C cable. Other embodiments may utilize a DC cable that couples to IHS 205 via a barrel connector coupling. The DC cabling, whether USB-C or a DC barrel connector cabling, may be received by a port 210g of the converter. The DC cable may be removable from port 210g, or may be fixed to port 210g. In some embodiments, converter 210c may include separate USB-C and DC barrel connector ports that may operate in the manner described for port 210g. Upon the AC converter being coupled to IHS 205, converter 210c and IHS 205 may initiate handshake procedures for identifying the capabilities of the AC adapter and in negotiating an output of converter 210c.

In USB-C embodiments, controller 210i of converter 210c and a USB controller of IHS 205, such as USB controller 111 of FIG. 1, may initiate USB-PD communications via a data pin of the USB-C coupling in determining the USB-PD outputs supported by converter 210c and in negotiating a USB-PD output (e.g., 5V, 9V, 15V, 20V) to be supplied to IHS 205 by converter 210c. Additionally, embodiments may supplement these USB-PD communications with additional communications conducted between controller 210i and the USB controller of IHS 205 via a data pin of the USB-C coupling. These additional communications may identify converter 210c as being a multimode converter capable of providing high-power outputs of up to 60 volts. The additional communications may also support negotiating a particular supply output by converter 210c. In some embodiments, these additional communications for supporting high-power operations may be PSID signals that are transmitted along data pins of the USB-C coupling. In embodiments where converter 210c provides power to IHS 205 via a docking station, the docking station may support routing of USB data pathway communications between the IHS and the multimode AC adapter.

In embodiments that utilize a DC coupling with a barrel connector, a similar negotiation may be conducted between controller 210i of converter 210c and a power port controller of IHS 205, such as power port controller 114 of FIG. 1. In such embodiments, controller 210i and the power port controller of IHS 205 may exchange PSID messages via a data line included in the DC cabling. The exchanged PSID messages may identify converter 210c as a multimode converter capable of generating high-power outputs, as well as specifying ordinary power outputs that are supported by the converter. Additional PSID messages may be exchanged that negotiate a supply output by converter 210c. In embodiments where converter 210c provides power to IHS 205 via a docking station, the docking station may support routing of PSID data pathway communications between the IHS and the multimode AC adapter.

As indicated in FIG. 2B, controller 210i may utilize a data pathway 210k in receiving data line communications received by port 210g, whether the port is a USB-C port that transmits USB data pin communications or whether port 210g is a DC port relaying on PSID communications. Based on such data communications, controller 210i may specify the capabilities of converter 210c to IHS 205 or to a docking station and may negotiate the output to be supplied by converter 210c. Once the supply output of converter 210c has been negotiated, controller 210i may configure multimode regulator 210m for generating the negotiated output. In some instances, port 210g may be a USB-C power cord and controller 210i may negotiate a USB-PD output by converter 210c. In such instances, controller 210i may configure multimode regulator 210m to deliver a USB-PD output, via power pathway 210n, to port 210g. In other instances, controller 210i may negotiate a high-power output by converter 210c. In such instances, controller 210i may configure multimode regulator 210m to route its output to high-power conversion circuit 210j for generating a high-power output of a voltage up to 60 volts and delivering greater than 200 watts of power.

As described with regard to FIG. 1, a high-power conversion circuit 128 may be utilized by an IHS 100 to efficiently convert high-power supply inputs of up to 60 volts to a voltage (e.g., 18-20 volts) suitable of use by IHS 100. In some embodiments, the high-power conversion circuit 128 of IHS 100 may be a buck-boost converter that may include capacitive and/or inductive boost capabilities. In some embodiments, the boost capabilities of this same buck-boost, high-power conversion circuit 210j may be utilized by multimode AC converter 210c in efficiently generating high-power supply outputs. In such embodiments, the same conversion circuit may be utilized by both the power supply unit of IHS 205 and the AC converter 210c. In some embodiments, boost capabilities of a high-power conversion circuit 210j may be implemented using capacitive elements, such as switched capacitors that may be driven at high frequencies in order to provide high-efficiency conversions with as little as 2% loss. Such capacitive conversion elements provide efficient conversions but are capable of supporting only a limited number of conversion ratios, thus limiting the use of capacitive elements to use in converting a certain set of input and output voltages. Some embodiments may additionally or alternatively implement boost capabilities using inductive elements, thus operating at reduced efficiencies, but providing the ability to support a wider range or conversions. In some embodiments, the high-power conversion circuit 210j included in multimode AC converter 210c may include only boost converter capabilities, and may thus provide complimentary capabilities to a buck converter or buck-boost high-power conversion circuit 128 in the coupled IHS 205.

Figure 2C:
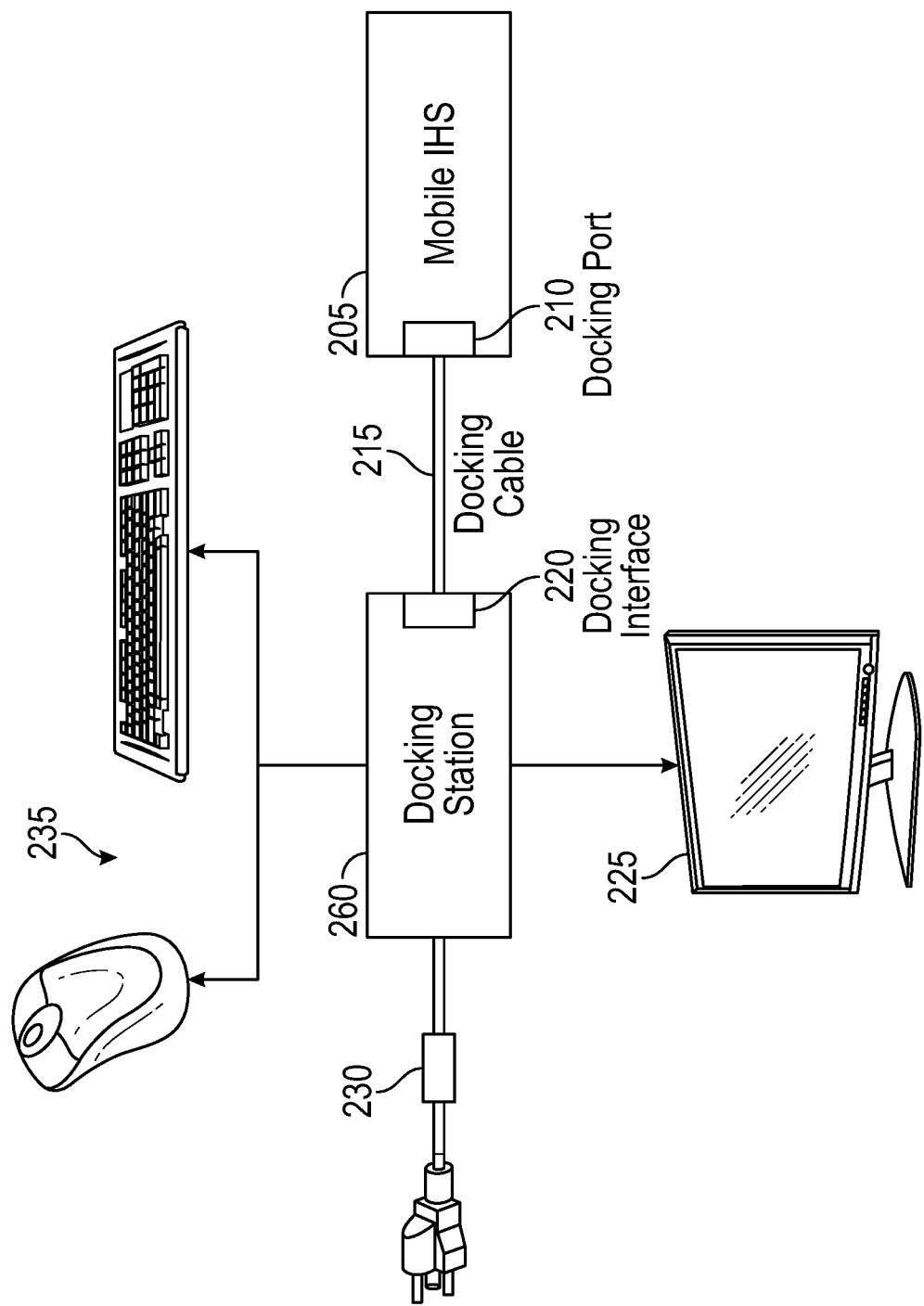
FIG. 2C is a diagram depicting certain components of a multimode USB-C docking system according to various embodiments and including a docking station and an IHS.

FIG. 2C is a block diagram illustrating certain components of a multimode docking system that includes a multimode docking station 260 that provides an IHS 205 with access to one or more devices 225, 235. In many scenarios, an IHS 205 that utilizes a docking station 260 may be a mobile IHS that may be used at various locations, including at a workstation at which docking station 260 is provided. As illustrated, a docking station 260 may provide a mobile IHS 205 with use of one or more external displays 225. A docking station 260 may also provide use of various user I/O devices 235, such as a mouse and keyboard, which may be coupled to the docking station 260 via wired or wireless connections. While coupled to docking station 260, mobile IHS 205 may be configured such that all user inputs and outputs generated in the operation of the mobile IHS 205 are provided via docking station 260, while some or all of the user input and output capabilities of mobile IHS 205 may be disabled.

As illustrated, a mobile IHS 205 is coupled to a docking station 260 via a docking cable 215. In certain instances, the docking station 260 includes a docking interface 220 that receives one end of the docking cable 215 and the mobile IHS 205 includes a docking port 210 that receives the other end of the docking cable 215. In some embodiments, both the docking interface 220 of the docking station 260 and the docking port 210 of IHS 205 may be USB-C ports, such that docking cable 215 may be a reversible USB-C cable. In such embodiments, a USB-C docking cable 215 supports data communications and power transmissions between IHS 205 and docking station 260.

As illustrated, a docking station 260 may be coupled to an AC adapter 230 by which the docking station 260 receives DC power. As described in additional detail with regard to FIGS. 3A and 3B, docking station 260 may use the received DC power to provide power to mobile IHS 205. In some embodiments, AC adapter 230 may include a barrel connector capable of providing up to 330 watts of power (at approximately 20 volts) to docking station 260. In such embodiments, the barrel connector of AC adapter 230 may be compatible with a power port of mobile IHS 205. In non-illustrated embodiments, AC adapter 230 may be a multimode AC adapter 210 such as described with regard to FIGS. 2A and 2B, such that the USB-C connector 210e may be coupled to a USB-C port of docking station 260. In such embodiments, the multimode AC adapter 210 may negotiate with docking station 260 in order to determine the output of AC adapter 210 which may include USB-PD outputs as well as the described high-power outputs.

Figure 3A:
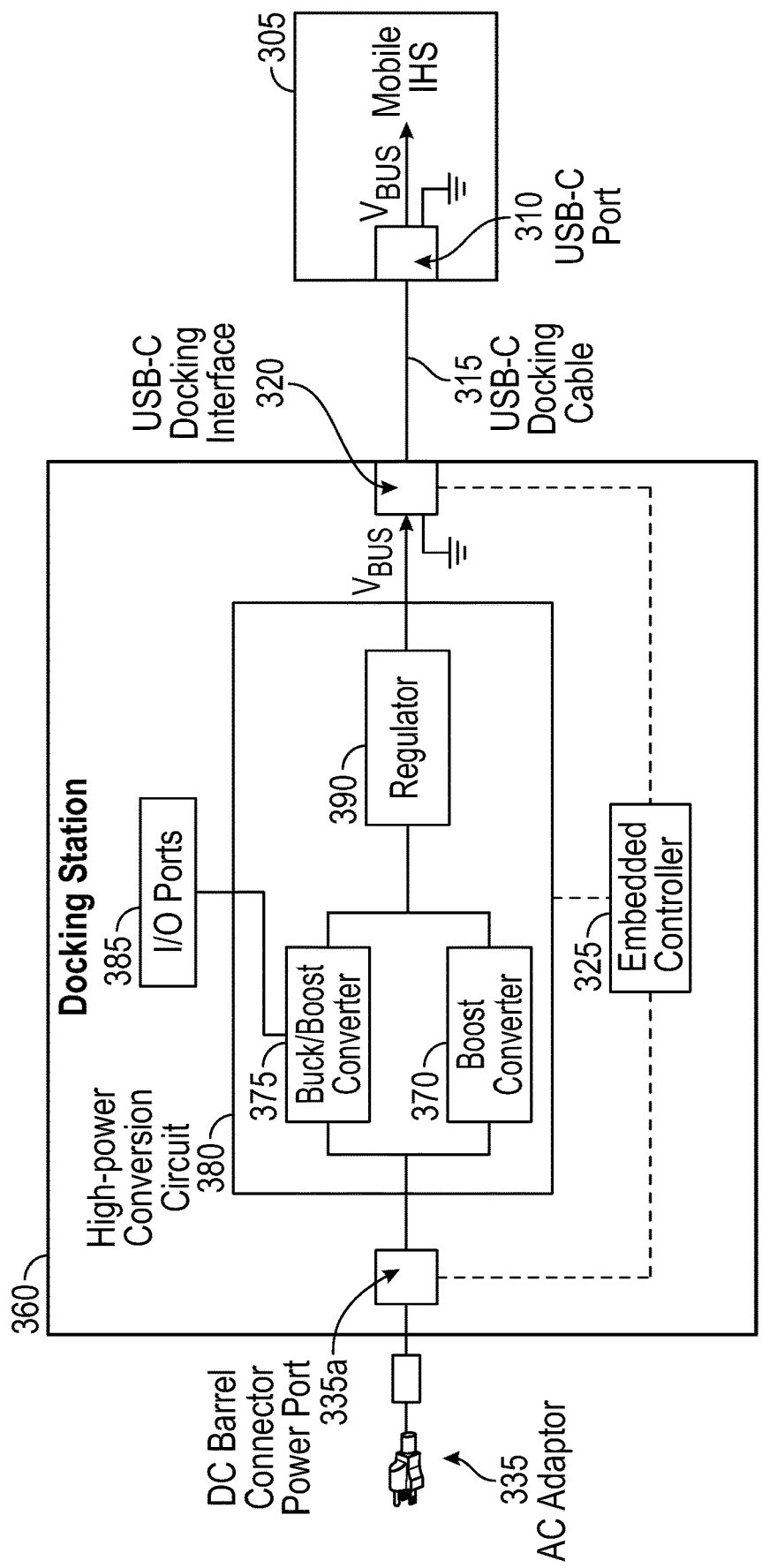
FIG. 3A is a block diagram illustrating certain components of a multimode USB-C docking station according to various embodiments.

FIG. 3A is a block diagram illustrating certain components of a multimode USB-C docking station 360 according to some embodiments. In providing power to the mobile IHS 305, the multimode docking station 360 may receive power via an AC adapter 335 that is coupled to a DC power connector 335a supported by the docking station. Multimode docking station 360 receives power via a power port 335a that is compatible with a barrel connector of the AC adapter 335. Via this barrel connector coupling, an AC adapter 335 may deliver over 300 watts of power to the docking station 360. As illustrated, the multimode docking station 360 may be coupled to IHS 305 via a USB-C coupling that utilizes a reversible USB-C docking cable 315 that is received by a USB-C port 320 of the docking station 360 and USB-C port 310 of IHS 305.

Multimode docking station 360 may include an embedded controller 325 that detects the coupling of an AC adapter 335 to power port 335a. Once an AC adapter 335 is detected as being coupled to port 335a, embedded controller 325 may identify the detected AC adapter. In some embodiments, embedded controller 325 may identify AC adapter 355 via PSID signals that are communicated by a logic unit of the AC adapter and transmitted via a data path supported by AC adapter 335. The PSID signal received by embedded controller 325 may specify the type (e.g., model) of the AC adapter 335 and/or may specify power output characteristics of the AC adapter 335.

As illustrated in FIG. 3A, power received at power port 335a is routed to a high-power conversion circuit 380 that may include two power pathways. In order to determine the appropriate routing for received power, embedded controller 325 may communicate with mobile IHS 305 in order to determine the power supply inputs to be provided by multimode docking station 360 to IHS 305. As described with regard to the embodiment of FIG. 1, a mobile IHS 100 according to embodiments may utilize an embedded controller 126 that may be used in configuring aspects of various power and charging modes of a mobile IHS 100. Accordingly, in some embodiments, embedded controller 325 of multimode docking station may communicate with an embedded controller of mobile IHS 305 via data paths supported by USB-C docking cable 315 in order to determine the power to be supplied by the docking station 360. These communications between embedded controller 325 of the docking station and the embedded controller of the IHS 305 may serve to identify the docking station as a multimode power source capable of providing USB-PD power transmissions and high-power transmissions.

Based on the communications with IHS 305 that determine the supply voltage to be provided by the multimode docking station 360, embedded controller 325 may configure the power supply input received at power port 335a of docking station 360 to be routed to an appropriate power pathway of the high-power conversion circuit 380. In some scenarios, the embedded controller 325 may receive a request from IHS 305 for a USB-PD power transmission (e.g., 5V, 9V, 15V, 20V). In other scenarios, embedded controller 325 may instead receive a request from IHS 305 for a high-power transmission of up to 60 volts. As described with regard to the high-power conversion circuit of the IHS of FIG. 1 and also with regard to multimode AC adapters of FIGS. 2A and 2B, a high-power conversion circuit according to embodiments may include a buck-boost converter, where the buck operations may utilize digital voltage dividers and boost operations may be implemented using capacitive or inductive elements. In some embodiments, a multimode docking station 360 may utilize the same high-power conversion circuit 380 as the IHS 305, and as a multimode AC adapter that may instead be used in powering IHS 305.

In the embodiment of FIG. 3A, the high-power conversion circuit 380 includes both buck and boost capabilities. In particular, the high-power conversion circuit 380 includes a buck/boost circuit that may be used to provide power to external devices coupled to one or more I/O ports 385 of the multimode docking station 360. As illustrated, the high-power conversion circuit 380 also includes boost capabilities that may be used in supporting high-power transmissions to IHS 305. In scenarios where communications from the mobile IHS 305 request a USB-PD power transmission from the multimode docking station 360, the embedded controller 325 configures the high-power conversion circuit 380 for use of the buck/boost capabilities 375 to generate USB-PD outputs that are regulated 390 and transmitted via the USB power pathways of the docking cable 315. In scenarios where the mobile IHS 305 requests a high-power transmission, the boost converter 370 capabilities of the high-power conversion circuit 380 may be engaged by the embedded controller 325 in order to provide a regulated power transmission of up to 60 volts via the USB-C docking cable 315. The high-power conversion circuit 380 may concurrently utilize buck/boost converter 375 capabilities for providing power to external devices coupled to I/O ports 385 of the multimode docking station 360.

Figure 3B:
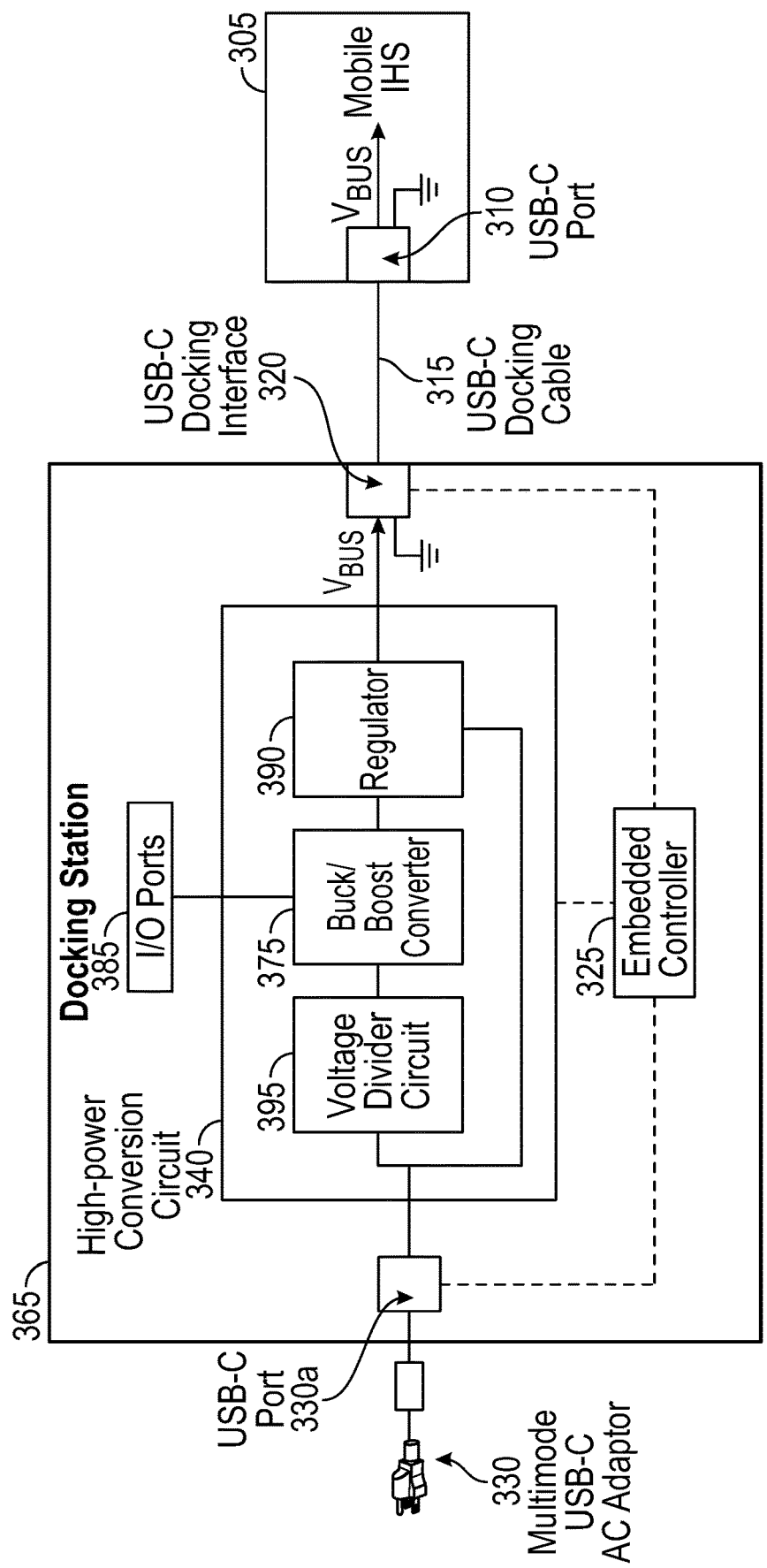
FIG. 3B is a block diagram illustrating certain components of a multimode USB-C docking station according to various additional embodiments.

FIG. 3B is a block diagram illustrating certain components of a multimode USB-C docking station 365 according to additional embodiments. Where the docking station of FIG. 3B receives power via a DC barrel connector input, the multimode docking station 365 receives power via a USB-C coupling with a multimode AC adapter 330, such as described with regard to FIGS. 2A and 2B. In providing power to the mobile IHS 305, the multimode docking station 365 may receive power from a multimode AC adapter 330 that is coupled to a USB-C port 330a supported by the docking station. Via this coupling, a multimode AC adapter 330 may deliver either USB-PD power transmission or high-power transmission of up to 60 volts. As illustrated, the multimode docking station 365 may be coupled to IHS 305 via a USB-C coupling that utilizes a reversible USB-C docking cable 315 that is received by a USB-C port 320 of the docking station 360 and USB-C port 310 of IHS 305.

Multimode docking station 365 may include an embedded controller 325 that detects the coupling of a multimode AC adapter 330 to USB-C port 330a. Once an AC adapter is detected as being coupled to port 330a, embedded controller 325 may identify the detected AC adapter. In some embodiments, embedded controller 325 may identify AC adapter 330 as a multimode adapter through communications exchanged with an embedded controller of the multimode AC adapter 330, such as with embedded controller 210i of the multimode converter of FIG. 2B. For instance, docking station 365 may communicate USB-PD messages via a data pathway of the USB-C coupling with the multimode AC adapter 330 in order to determine the USB-PD transmission capabilities of the adapter. As described, the multimode AC adapter 330 may be configured to specify its high-power transmission capabilities via additional USB communications and/or via PSID signals communicated via a data pathway of the USB-C coupling. Multimode docking station 360 may be configured to similarly identify its power transmission capabilities to IHS 305.

As illustrated in FIG. 3B, power received at USB-C port 330a is routed to a high-power conversion circuit 340 that may include two power pathways. In order to determine the appropriate routing for received power, embedded controller 325 may communicate with mobile IHS 305 in order to determine the power supply inputs to be provided by multimode docking station 365 to IHS 305. As described, embedded controller 325 of a multimode docking station may communicate with an embedded controller of mobile IHS 305 via data paths supported by USB-C docking cable 315 in order to determine the power to be supplied by the docking station. Communications between embedded controller 325 of the docking station and the embedded controller of the IHS 305 may serve to identify the docking station as a multimode power source capable of providing USB-PD power transmissions and high-power transmissions.

Based on the communications with IHS 305 that determine the supply voltage to be provided by the multimode docking station 365, embedded controller 325 may configure the power supply input received at power port 330a of docking station 365 to be routed to an appropriate power pathway of the high-power conversion circuit 340. In some scenarios, the embedded controller 325 may receive a request from IHS 305 for a USB-PD power transmission (e.g., 5V, 9V, 15V, 20V). In other scenarios, embedded controller 325 may instead receive a request from IHS 305 for a high-power transmission of up to 60 volts. As described with regard to the high-power conversion circuit of the IHS of FIG. 1 and also with regard to multimode AC adapters of FIGS. 2A and 2B, a high-power conversion circuit according to embodiments may include a buck-boost converter, where the buck operations may utilize digital voltage dividers and boost operations may be implemented using capacitive or inductive elements. In some embodiments, a multimode docking station 365 may utilize the same high-power conversion circuit 340 as the IHS 305, and as a multimode AC adapter that may instead be used to directly power IHS 305.

In the embodiment of FIG. 3B, the high-power conversion circuit 340 includes both buck and boost capabilities and also includes a bypass 340a pathway for routing the power transmission of the multimode AC adapter 330 to the IHS via the USB-C docking cable. In scenarios where communications from the mobile IHS 305 request a USB-PD power transmission from the multimode docking station 365, the embedded controller 325 may configure a USB-PD power transmission or a high-power transmission from the multimode AC adapter 330. In some scenarios USB-PD transmission requested from the multimode AC adapter 330 may be routed directly to the docking cable 315 coupling via the bypass pathway 340a of the high-power conversion circuit 340. However, in certain instances, a multimode docking station 365 may be coupled to one or more external devices via I/O ports 385, where some of these external devices may be configured to draw any available power provided by the docking station 365. In such instances, embedded controller 325 may receive a request for a USB-PD power transmission from IHS 305, but may request a high-power supply from multimode AC adapter 330.

As illustrated, in addition to a bypass pathway 340i, the high-power conversion circuit 340 may include a power circuit that includes a digital voltage divider circuit 395 followed by a buck/boost converter 375. As described, a high-power conversion circuit may provide efficient conversion of high-power inputs of up to 60 volts to voltages suitable by IHSs via the use of digital voltage dividers driven at high frequencies. Such a digital divider circuit 395 may be utilized to efficiently convert high-power inputs of up to 60 voltages to one or more supply voltages that may converted by a buck/boost circuit 375 as required to provide appropriate supplies of power to external devices coupled to I/O ports 385 of the multimode docking station 365. With a portion of the supplied power being used to power external devices, regulator 390 may be used to further draw from the high-power input provided by the multimode AC adapter to generate the appropriate USB-PD power transmission requested by IHS 305.

In scenarios where the mobile IHS 305 requests a high-power transmission from multimode docking station 365, embedded controller 325 propagates this request for a high-power transmission to multimode AC adapter 330. In such instances, the high-power transmission from the multimode AC adapter 330 is routed directly to the IHS 305 via the bypass pathway 340a of the high-power conversion circuit 340. The high-power transmission of up to 60 volts may be received by the IHS 305 and efficiently converted to a suitable voltage using a high-power conversion circuit that may include that same capabilities of the high-power conversion circuit 340 utilized by multimode docking station 365. In the embodiment of FIGS. 3A and 3B, docking station 360 utilizes a barrel connector AC adapter and docking station 365 utilizes a multimode AC adapter. Some multimode docking station embodiments may include both a DC barrel connector port and a USB-C port and may be configured to receive power via either a barrel connector AC adapter, such as AC adapter 335, or via a multimode AC adapter 330. In such embodiments, the multimode docking station may utilize a high-power conversion circuit that includes the capabilities described for the high-power conversion circuit 380 of FIG. 3A and also includes the capabilities for the high-power conversion circuit 340 of FIG. 3B.

Figure 4:
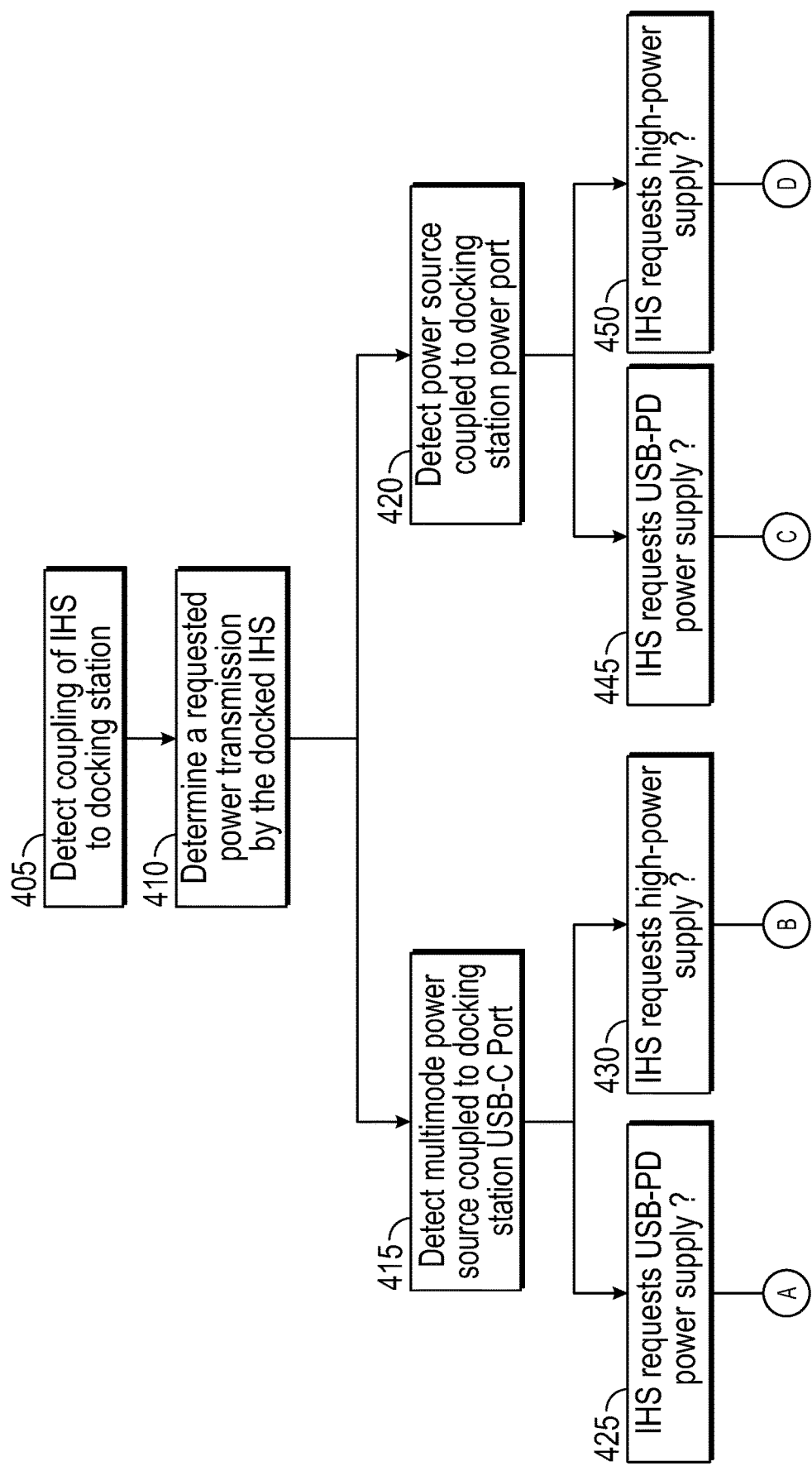
FIG. 4 is a flow chart diagram illustrating certain steps of a process according to various embodiments for multimode transmission and conversion of power delivery to an IHS using a docking system.
Figure 4:
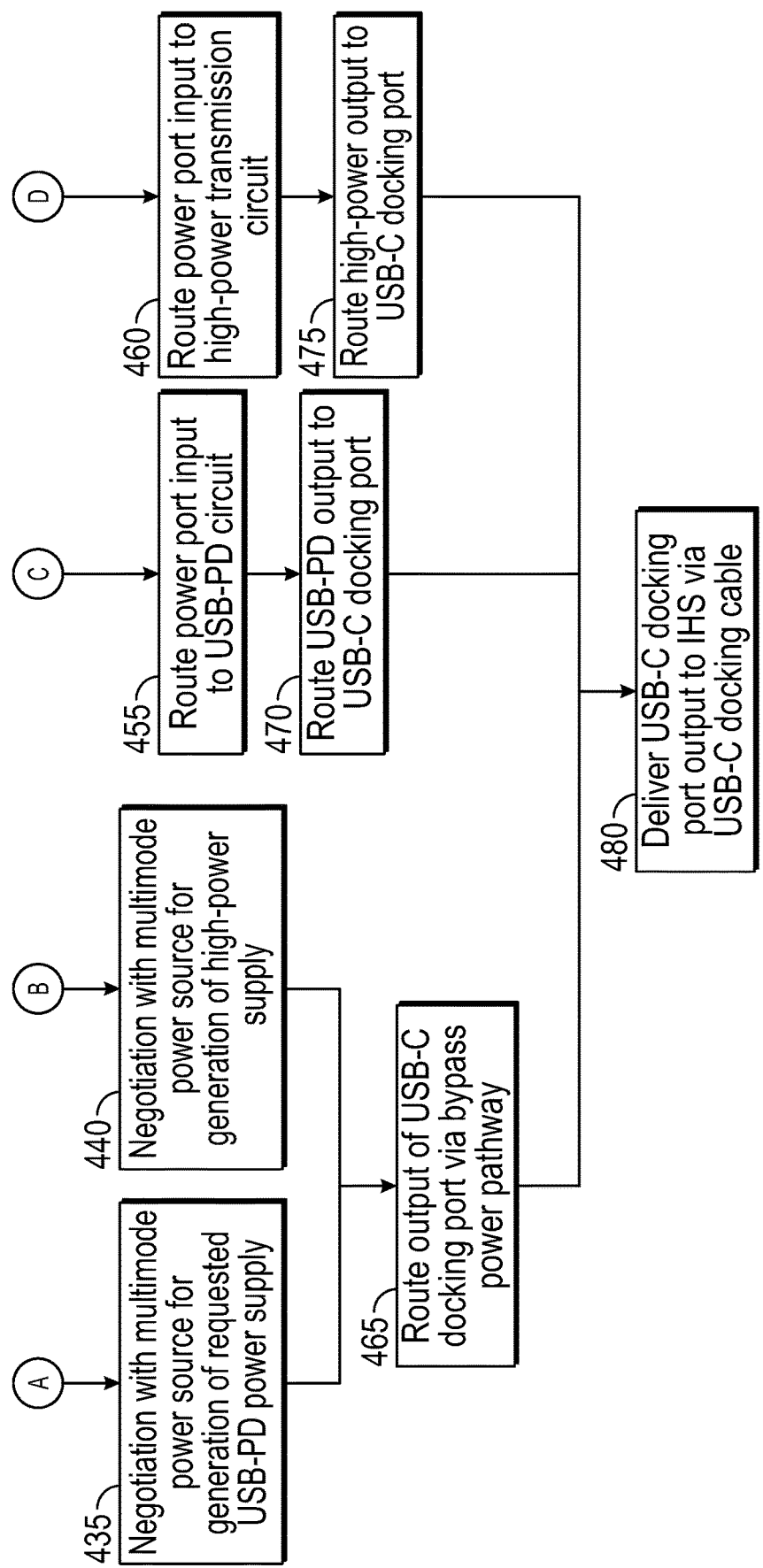

FIG. 4 is a flow chart illustrating steps of a process according to various embodiments for transmission and conversion of power delivery to an IHS using a multimode docking system. In some scenarios, embodiments may begin at block 405 with the coupling of an IHS to a docking port of a multimode docking station. As described with regard to FIGS. 3A and 3B, a multimode docking station according to embodiments may include an embedded controller that detects the coupling of an IHS to a USB-C docking port supported by the docking station. At block 410, the embedded controller of the multimode docking station communicates with the IHS in order to determine a requested power transmission by the docking station. In some embodiments, the embedded controller of the docking station determines parameters of the power requested by an IHS via communications with an embedded controller of the IHS, such as the embedded controller 126 of the IHS 100 of FIG. 1.

Once an IHS is detected as being docked and the requested power supply transmission for the IHS are determined, the docking station determines whether its power inputs can be used to support the power requested by the IHS. As described, in some embodiments, a multimode docking station may include both a barrel connector power port, by which to receive power from an AC adapter, and a USB-C port, by which power may instead be received from a multimode AC adapter, such as described with regard to FIGS. 2A and 2B. If a power source is detected as coupled to a USB-C port, at block 415, a multimode docking station according to embodiments may determine that the power source is a multimode USB-C power adapter that supports high-power supply outputs, such as described herein. In some embodiments, upon detecting a voltage drawn by the docking station, a multimode USB-C power adapter may be configured to generate identification signals that are transmitted on a data channel supported by the USB-C data pathways of the multimode AC adapter. The converter of the USB-C adapter may include logic for generating and transmitting such signals to the docking station. In response, the embedded controller of the multimode docking station may detect the transmission of such signals by the USB-C adapter. Based on the received signal, the docking station may determine that the USB-C power source is a multimode USB-C power source that supports high-power supply outputs.

In some scenarios, at block 425, the IHS requests a USB-PD power transmission, where the request may specify a particular USB-PD output mode (e.g., 5V, 9V, 12V, 20V). In such instances, at block 435, the embedded controller of the docking station may negotiate the transmission of the requested USB-PD supply by the connected multimode USB-C power source. Since the requested USB-PD supply is being provided to the docking station by the multimode USB-C power adapter, at block 465, the received power may be routed directly to the USB-C docking port via a bypass power pathway of the docking station. As described with regard to FIG. 3B, in some embodiments, such routing configurations may be implemented through operations of an embedded controller of the docking station. At block 480, the USB-PD supply routed to the USB-C docking port is transmitted to the IHS via the USB-C docking cable. Also as described with regard to FIG. 3B, in some embodiments, a multimode docking station may request a high-power transmission from a multimode AC adapter, even though the coupled IHS has requested a USB-PD power transmission. In such instances, the high-power transmission may be utilized by the multimode docking station to power external devices coupled to the docking station and to provide the requested USB-PD power transmission to the IHS.

In some scenarios, at block 430, the IHS requests a high-power supply, such as a supply of power of up to 60 volts and is suitable for transmission via a USB-C docking cable that is limited to 5-amp transmissions. In such instances, at block 440, the embedded controller of the docking station negotiates the transmission of a high-power output by the connected multimode USB-C power adapter. Since the requested high-power supply is being provided to the docking station by the multimode USB-C power adapter, at block 465, the received high-power supply may be routed directly to the USB-C docking port via a bypass power pathway of the docking station. As described with regard to FIG. 3B, in some embodiments, such routing configurations may be implemented through operations of an embedded controller of the docking station. At block 480, the high-power transmissions routed to the USB-C docking port are transmitted to the IHS via the USB-C docking cable, thus supporting the delivery of high-power transmissions of up to 60 volts via a 5-amp USB-C docking cable. As described with regard to FIG. 1, an IHS 100 may utilize a high-power conversion circuit 128 for efficiently converting high-power inputs received via a USB-C docking cable to a lower voltage suitable for powering IHS 100 in a manner that provides upwards of 200 watts of power.

In some scenarios, at block 420, the docking station may detect the coupling of an AC adapter to a power port of the docking station. Based on the power transmission requested by the IHS at block 410, the embedded controller may determine wither the requested supply may be provided via the power received at the power port. In some scenarios, at block 445, the IHS requests a USB-PD power delivery (e.g., 5V, 9V, 12V, 20V). In such instances, at block 455, the embedded controller of the multimode docking station may configure routing of the power received at the power port to a buck/boost circuit of the docking station that is configured to generate USB-PD power transmissions. At block 470, the generated USB-PD output is routed to the USB-C docking port of the docking station. At block 480, the USB-PD power transmission is then transmitted to the IHS via the USB-C docking cable.

In some scenarios, at block 450, the IHS is determined as requesting a high-power supply, such as a supply of power of up to 60 volts as described herein. In such instances, at block 460, the embedded controller of the docking station may configure routing of the power received at the power port to a high-power conversion circuit of the docking station, where the circuit is capable of generating high-power outputs of up to 60 volts that may be transmitted via a 5 amp USB-C cable. At block 475, the generated high-power output is routed to the USB-C docking port of the docking station. At block 480, the high-power supply that is routed to the USB-C docking port is transmitted to the IHS via the USB-C docking cable, thus supporting the delivery of high-power transmissions of up to 60 volts via a 5-amp USB-C docking cable. As described with regard to FIG. 1, an IHS 100 may utilize a high-power conversion circuit 128 for efficiently converting high-power inputs received via a USB-C docking cable to a lower voltage suitable for powering IHS 100 while providing upwards of 200 watts of power.

In this manner, a docking station may support high power transmissions via USB-C docking connections, where these power transmissions may be up to 60 volts and may be used by an IHS to generate over 200 watts of power for use in rapidly charging the batteries of an IHS, supporting high-power operations of an IHS and/or powering external devices coupled to the IHS. In addition, the high-power conversion capabilities of a multimode docking station may be used to power devices coupled to the docking station, while also providing power to a coupled IHS. Multimode docking stations and multimode USB-C AC adapters according to some embodiments may by be configured to support a nominal charging supply of 54 volts, thus allowing for 10 percent fluctuations in the actual charging output, while still maintaining outputs below 60 volts. Some embodiments may support other nominal high-power supply voltages that may range between 50 volts and 60 volts, depending in part on the anticipated fluctuations in the actual supply voltages. Many embodiments may support nominal supply voltages ranging from 54 volts to 57 volts.

High-power transmissions of up to 60 volts by AC adapters and docking stations may provide sufficient power for supporting rapid charging of an IHS, support high-power operations by an IHS and powering external device, but may first require conversion to lower voltages that are typically utilized by the power circuits of IHSs (e.g., 18-20 volts). Performing such voltage conversions using existing techniques generates prohibitive levels of heat. For instance, existing techniques may utilize a series of capacitive voltage dividers that generate a lower output voltage, but do so while also generating significant levels of heat. Accordingly, as described with regard to the high-power conversion circuit of FIG. 1, IHS embodiments may utilize a set of digital voltage dividers that generate significantly less heat than analog voltage dividers. In some instances, the multimode docking station and/or multimode USB-C adapter may negotiate the high-power output to be provided to an IHS based on the characteristics of the digital voltage dividers available for converting the high-power supply voltage to a lower voltage usable by an IHS. For instance, the embedded controller of the IHS may negotiate a 54-volt supply by a multimode AC adapter or by a multimode docking station, which may be converted to an 18-volt output using two digital voltage dividers of the high-power conversion circuit. Implementing this particular conversion using existing analog voltage dividers may require three or more analog voltage dividing circuits, thus resulting in conversion efficiencies of approximately 88 percent. Such levels of inefficiency not only result in wasted power, but also may generate up to 25 watts of heat from the operation of the IHS conversion circuit. Digital voltage divider conversion according to embodiments may result in efficiencies approaching 98 percent, thus resulting in an approximate loss of only 5 watts. In some embodiments, the embedded controller of an IHS may negotiate a lower supply voltage (e.g., 36 volts) with the multimode AC adapter or multimode docking station, thus requiring use of only a single digital voltage divider by the high-power conversion circuit to reach an 18-volt output, while generating even less heat.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A docking station for providing power to an Information Handling System (IHS) via a USB-C (Universal Serial Bus Type-C) docking connection, the docking station comprising:
   a USB-C port;
   a USB-C docking port;
   a plurality of ports for coupling external devices to the docking station; and
   a logic unit operable to:
      detect a multimode USB-C adapter coupled to the USB-C port based on signals provided by the multimode adapter, wherein the multimode USB-C adapter supports USB-PD (Universal Serial Bus Power Delivery) power transmissions, and wherein the multimode USB-C adapter further supports a high-power transmission of a voltage greater than the USB-PD power transmissions;
      configure a power transmission by the multimode USB-C adapter based on a power request by the IHS, wherein the IHS is coupled to the USB-C docking port; and
      when the power transmission by the multimode adapter comprises a USB-PD power transmission, utilize a power circuit of the docking station to provide the USB-PD power transmission of the multimode USB-C adapter to the IHS; and
      when the power transmission by the multi-mode adapter comprises a high-power transmission, utilize the power circuit to use the high-power transmission to provide a USB-PD power transmission to the IHS and to utilize a portion of the high-power transmission for use by the external devices that are coupled to the docking station.

2. The docking station of claim 1, wherein the high-power transmission comprises a nominal voltage of 54 volts.

3. The docking station of claim 1, wherein the high-power transmission comprises a peak voltage not exceeding 60 volts.

4. The docking station of claim 1, further comprising:
   a power port for receiving a barrel connection of an AC power supply, wherein the logic unit is further operable to configure the power circuit of the docking station for converting a power transmission of the AC power supply for transmission to the IHS.

5. The docking station of claim 4, wherein the high-power power transmission by the multimode adapter is converted by the power circuit to a USB-PD power transmission based upon a power request by the IHS.

6. The docking station of claim 1, wherein the high-power transmission provided to the IHS comprises greater than 200 watts of power.

7. The docking station of claim 1, wherein the power circuit comprises a plurality of digital voltage dividers operable for converting the high-power transmission for use by the external devices.

8. The docking system of claim 5, wherein the logic unit is further operable to:
   configure the high-power transmission by the multimode USB-C adapter when the power request by the IHS comprises a request for a USB-PD power transmission and one or more of the external devices coupled to the docking station are configured to draw power from the docking station.

9. A system comprising:
   a multimode docking station coupled to an Information Handling System (IHS) via a USB-C docking port, wherein the docking station utilizes a high-power conversion circuit in converting a high-power input for power transmissions to the IHS via a USB-C cable, wherein the power transmissions comprise USB-PD power transmission and high-power transmissions of voltages greater than voltages of USB-PD transmissions; and
   the IHS comprising:
      one or more processors;
      a memory device coupled to the one or more processors, the memory device storing computer-readable instructions that, upon execution by the one or more processors, cause execution of an operating system of the IHS;

a USB-C port coupled to the USB-C docking port via the USB-C cable; and an embedded controller comprising a memory having program instructions stored thereon that, upon execution by a logic unit of the embedded controller, cause the embedded controller to:

detect a coupling of the multimode docking station to the USB-C port;

send a power request to the multimode docking station via the USB-C port coupling;

route the USB-PD power transmissions received from the multimode docking station to a power supply unit of the IHS; and route the high-power transmissions received from the multimode docking station to a high-power conversion circuit of the IHS for conversion to a USB-PD supply to the power supply unit of the IHS, wherein the high-power conversion circuit is the same as the high-power conversion circuit of the multimode docking station.

10. The IHS of claim 9, wherein the high-power supply input received from the docking station comprises a nominal voltage of approximately 54 volts.

11. The IHS of claim 9, wherein the high-power supply input received from the docking station comprises a peak voltage not exceeding 60 volts.

12. The IHS of claim 8, wherein the high-power conversion circuit comprises a plurality of digital voltage dividers operable for converting the high-power supply input received from the docking station to an input utilized by the IHS.

13. The IHS of claim 12, wherein the high-power conversion circuit is configured by selecting a portion of the plurality of digital voltage dividers for use in converting the high-power supply input to the input.

14. The IHS of claim 12, wherein the high-power supply input comprises greater than 200 watts of power.

15. A method for powering an Information Handling System (IHS) by a docking station via a USB-C docking connection, the method comprising:

detecting a multimode USB-C power source coupled to a USB-C port of the docking station based on signals provided by the multimode power source, wherein the multimode USB-C power source supports USB-PD (Universal Serial Bus Power Delivery) power transmissions, and further supports a high-power transmission of a voltage greater than the USB-PD power transmissions;

configuring a power transmission by the multimode USB-C power source based on a power request of the IHS;

when the power transmission by the multimode adapter comprises a USB-PD power transmission, utilizing a power circuit of the docking station to provide the USB-PD power transmission of the multimode USB-C adapter to the IHS; and when the power transmission by the multi-mode adapter comprises a high-power transmission, utilizing the power circuit to use the high-power transmission to provide a USB-PD power transmission to the IHS and to use a portion of the high-power transmission for use by external devices that are coupled to the docking station.

16. The method of claim 15, wherein the high-power transmission comprises a nominal voltage of 54 volts.

17. The method of claim 15, wherein the high-power transmission comprises a peak voltage not exceeding 60 volts.

18. The method of claim 15, wherein the high-power transmission provided to the IHS comprises greater than 200 watts of power.

19. The method of claim 15, wherein the power circuit comprises a plurality of digital voltage dividers operable for converting the high-power transmission for use by the external devices.

20. The method of claim 15, further comprising:

configuring a high-power transmission by the multimode USB-C source when a power request by the IHS comprises a request for a USB-PD power transmission; and configuring the power circuit to utilize the high-power transmission for providing power to the external devices and for generating the requested USB-PD power transmission to the IHS.

* * * * *